(12) United States Patent
Lancaster

(10) Patent No.: US 8,377,164 B2
(45) Date of Patent: Feb. 19, 2013

(54) COMPOSITION FOR INCREASING SOIL FERTILITY

(76) Inventor: Larry Lancaster, Comfort, TX (US)

(*) Notice: Subject to any disclaimer, the term of this patent is extended or adjusted under 35 U.S.C. 154(b) by 502 days.

(21) Appl. No.: 11/900,581

(22) Filed: Sep. 12, 2007

(65) Prior Publication Data

US 2008/0121005 A1    May 29, 2008

Related U.S. Application Data

(60) Provisional application No. 60/844,304, filed on Sep. 13, 2006.

(51) Int. Cl.
   *C05D 9/02* (2006.01)
   *C05D 9/00* (2006.01)
   *C05F 11/00* (2006.01)

(52) U.S. Cl. .................... 71/62; 71/11; 71/27

(58) Field of Classification Search ............ 71/1, 11–30, 71/48, 62
   See application file for complete search history.

(56) References Cited

U.S. PATENT DOCUMENTS

| | | | | |
|---|---|---|---|---|
| 4,402,756 | A * | 9/1983 | Prine | ............................ 106/457 |
| 4,570,713 | A | 2/1986 | Rice | |
| 4,571,328 | A | 2/1986 | Rice | |
| 4,952,229 | A | 8/1990 | Muir | |
| 5,663,425 | A | 9/1997 | Detroit et al. | |
| 6,204,396 | B1 * | 3/2001 | Rasmussen et al. | .......... 549/393 |
| 7,293,568 | B2 | 11/2007 | Elledge | |

FOREIGN PATENT DOCUMENTS

| | | |
|---|---|---|
| EP | 0 786 490 A2 | 7/1997 |
| GB | 1 280 397 A | 7/1972 |
| WO | WO 01/58831 A1 | 8/2001 |
| WO | WO 2005/014478 A2 | 2/2005 |

OTHER PUBLICATIONS

Matichenkov, VV and Bocharnikova E.A. New Technologies for Optimizing Irrigation and Increasing Soil Fertility in Dry and Semi-Dry Regions. Technical Session on Agriculture Conservation at the International Water Demand Management Conference May 30-Jun. 3, 2004.

European Patent Office, International Search Report and Written Opinion, Jul. 3, 2008.

* cited by examiner

*Primary Examiner* — Stanley Silverman
*Assistant Examiner* — Jennifer Smith
(74) *Attorney, Agent, or Firm* — Jackson Walker L.L.P.

(57) ABSTRACT

A composition, and its manufacture, used to add supplemental materials to plants for the purpose of increasing or modifying growth or the composition of the plant. The composition comprises silicon, sodium hydroxide, water, and a humic acid and fulvic acid blend.

2 Claims, 25 Drawing Sheets

Quick-Sol Base Material Production

```
Load Reactor 14-6-Si-H2O
        ↓
Heat to 100F
        ↓
Add NaOH
        ↓
Maintain 195F for 8 hrs by adding water
        ↓
Maintain 150F for 12 hrs w/ water or heat
        ↓
Maintain 110F for 16 hrs w/ heat
        ↓
Dilute to 1.45 Sp Gvty Circulate 1 hr
        ↓
Move to insulated tank for 24 hrs; Allow to cool
        ↓
Dilute to 1.40 Sp Gvty Move to finished base tank
```

Quick-Sol Finished Product Production

```
Load base product in Reactor #2
Heat to 125F
        ↓
In a 5 gal pail dilute base material 500:1 w/ water. Add 2lbs of humic/fulvic
For each 100 gal of base material in reactor. Mix well
        ↓
Add 5 gal pail of concentrate humic to heated base material and circulate for 1 hour
        ↓
Allow to cool to 100F and move to finish product tank
```

Figure 1

COMPOSITION FOR INCREASING SOIL FERTILITY

This application claims priority to U.S. Provisional Patent Application Ser. No. 60/844,304, entitled "Composition for Increasing Soil Fertility," filed on Sep. 13, 2006, the entire content of which is hereby incorporated by reference.

BACKGROUND

This invention relates to a product which can be used as a foliar spray or drench to add silicic, polysilicic, monosilicic acids and humic/fulvic to the plants and soil. This results in an increase the levels of silicon in the cellular structures of the treated plants. This increase in silicon levels can enable plants to process photosynthesis more efficiently and also to resist fungal and algael infections. Increased levels of silicon also allow the plant to withstand wind and freeze damage. Silicon nutrition in plants is also correlated with better crop yields because it may increase the growth, mechanical strength, and stress-resistant capabilities of plants, and improve resistance to abiotic and biotic stress.

Soil fertility refers to the innate ability of soil to provide necessary amounts of nutrients, in appropriate portions. Traditionally, plant growth was attributed to soil fertility, or as was often the case, calculating how much material (such as fertilizers) needed to be added to improve the mineral elements in soil. There are numerous mineral elements which are considered "essential" for plant growth, while others are considered "beneficial". Silicon has recently been described by several agriculturalists and scientists as an "essential" mineral, given its effect on the mineral nutrition of plants and the effect on the structure of the soil adjusting and restoring it. Silicon has proven to increase soil tolerance related to the presence of excessive aluminum concentrations, and to fight zinc deficiencies.

Soil properties have a significant effect on groundwater vulnerability to water table contamination caused by the introduction of metals and other contaminants. Contamination is facilitated by leaching (removal of soluble materials by water passing through soil). In essence, contaminants such as pesticides and chemical fertilizers can move through the soil via leaching, based on the volume and rate of water movement. This may ultimately contaminate the water table. Addition of elements to the soil which may increase the ion exchange capacity of the soil may positively impact the contamination levels of the water table. A discussion of new technologies for optimizing irrigation and increasing soil fertility in dry and semi-dry regions was presented in a technical session on Agriculture Conservation at the International Water Demand Management Conference May 30 to Jun. 3, 2004 (Matichenkov, 2004).

Research has demonstrated that silicon deposits in plants' epidermal zone (outermost layer of cells) help to create a barrier against diseases and insects. The accumulation of silicon essentially forms a double cuticle (non-cellular protective layer covering the epidermis layer), helping to create a mechanical defense against insects and helping to prevent cell wall penetration caused by attacking fungi. However, there is a need for a simple means of creating a stable aqueous silicon solution which could be used in agriculture to transfer silicon to the soil and plants in a non-toxic way.

U.S. Pat. No. 4,571,328 to Rice describes a process for the electrodeposition of silicon on a cathode. This involves the preparation of a solution containing silicon, sodium hydroxide and water, and the further use of this solution to form a silicon-containing metal compound.

U.S. Pat. No. 4,570,713 to Rice describes another process for preparing a solution comprising metal, alkaline metal hydroxide and water, and the further use of this solution for removing oil from an oil-bearing material.

An additional process for preparing a solution comprising these elements is described in U.S. Patent Publication 20060027251.

SUMMARY

The invention comprises a composition which improves soil fertility and prevents soil degradation. These properties may help to protect plants against disease, insect and fugal attacks, protect plants against salinity, drought, and temperature stress. This product may also aid in irrigation and water management practices and reduce water table contamination.

The invention may further increase growth and productivity of crops by facilitating the incorporation of minerals, vitamins, nutrients or other elements, including phosphorus, nitrogen, potassium, calcium, magnesium, iron, zinc, and molybdenum by plants. The invention may protect against weather-induced stress including drought, extreme temperatures, and water excess. The invention may increase the water retention capacity of soil, and can impact soil texture and improve drought resistance. Additionally, the presence of silicon increases the water absorption rate which, in turn, helps to reduce the evaporation rate. By supplying soluble silicon to cell walls, the invention may help to improve plant resistance to water stress and wilting, and facilitates protection against extreme heat or cold. The invention may also help to augment root volume and weight.

The invention may increase crop productivity, quality, and reduce cost for crop cycles for numerous crops in the agriculture, horticulture, and forestry industries. These crops include Extensive, Intensive, Ornamentals, and plants used in the Pharmaceutical and Chemical industries. The invention may combat infection of plant roots, protect new plant growth, and prevent damage by insects. The invention may also allow plants to more effectively consume $CO_2$, and improve the storage and distribution of carbohydrates and increase chlorophyll production in plants.

Examples of plants which may benefit from treatment with the invention include achiote, alfalfa, aloe vera, apricots, artichokes, asparagus, avocados, bananas, basil, berries, broad beans, beans, broccoli, cantaloupe melons, carrots, cassavas, cauliflower, celery, chamomile, cherries, cilantro, coffee, corn, cotton, crotons, cucumbers, eucalyptus, ferns, ginger, grapefruit, grapes, hot peppers, lemon balms, lettuce, limes, marigolds, olives, onions, oranges, oregano, palms, paprika, parsley, pastures, peaches, pears, peas, peppers, peppermint, pineapples, plantains, potatoes, pumpkins, radishes, rice, rosemary, rutas, sorghums, soy, strawberries, sugar cane, sunflowers, tangerines, teak, tobacco, tomatoes, valerians, watermelons, cotton, flowering plants, spices, and wheat.

The invention may also improve the bio-availability of soil nutrients and fight the decline in soil fertility that results from loss of organic matter, wind/water erosion, compaction, salinization (build up of salt in soil), contamination, and acidification. The invention may improve the mechanical strength of plants, thereby helping to protect crops from diseases, fungus, insects, high salinity levels in arid regions, or stress caused by mineral and environmental factors. The invention may decrease the level at which irrigation water needs to be applied to crops without affecting crop quality or productivity.

The invention may provide a source of monosilicic, polysilicic, humic, and fulvic acids, thereby aiding in the control of numerous soil conditions such as pH, nutrient mobility, heavy metal and aluminum toxicity, soil absorption capacity, and ion exchange capabilities. The invention may stimulate soil microbial health and activity.

Through the reduction of the leaching (potting effect), the invention may also allow a better use of the beneficial nutrients such as phosphorous, nitrogen, and potassium, which may aid in avoiding the leaching of these nutrients into the water table. The invention my also fight toxicity by diminishing heavy metals and hydrocarbons.

Finally, the invention may also provide beneficial effects in terms of plant growth, crop production and general plant health when used in combination with natural compounds such as manure, bone meal, fish meal, or guano.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1 shows two flow diagrams detailing the preferred embodiment of a process for making an aqueous metal hydride product which can be used to add supplemental materials to plants for the purpose of increasing or modifying growth or the composition of the plant. The flow diagram on the left shows the production of Base Material. The flow diagram on the right shows the production of Finished Product.

DETAILED DESCRIPTION OF PREFERRED EMBODIMENTS

Figure 2:
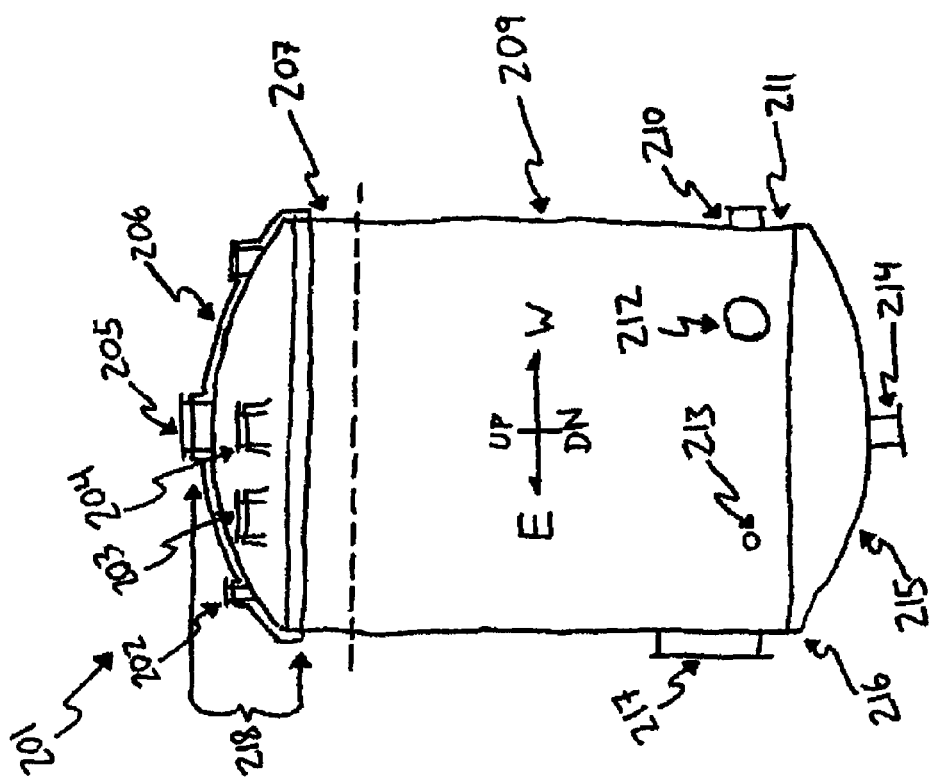
FIG. 2 shows a side view of a preferred embodiment of an apparatus used in the process of making a product which can be used to add supplemental materials to plants for the purpose of increasing or modifying growth or the composition of the plant.

The invention relates to a product which can be used to add supplemental materials to plants for the purpose of increasing or modifying growth or the composition of the plant ("the Aqueous Metal Hydride"). The ratio used herein means weight ratio.

Process for Making the Aqueous Metal Hydride

A first aspect of the current invention comprises a process for making the Aqueous Metal Hydride which can be used as a foliar spray or drench to add metals and organic acids to soil and to plants. A first step in this process is to combine silicon rock and water in a container such as a monel reactor to form a first mixture ("the First Mixture"). In a preferred embodiment of the invention, the silicon rock and the water will be in a weight ratio of about 14:6. The First Mixture is then heated, preferably to between about 80° F. to 120° F., most preferably to about 100° F. Sodium hydroxide is then added to the First Mixture to form a second mixture ("the Second Mixture"), such that the silicon, the water, and the sodium hydroxide will be in a weight ratio of about 14:6:1.

In a preferred embodiment of the invention, the reagents in the Second Mixture are prevented from rising above about 210° F., preferably not above 195° F., by the addition of water to the reaction. Water may be added to the solution in sufficient quantities that the weight ratio of silicon rock to water to sodium hydroxide reaches approximately 14:18:1.

The temperature of the second mixture is maintained between approximately 180° F. to 210° F., preferably about 195° F., for approximately 6-10 hours, preferably for about 8 hours. After this time, the temperature is allowed to drop to between 140° F. and 160° F., preferably below about 150° F., and maintained in that range for an additional several hours, preferably 12 hours. Following this, the temperature is maintained in the range of about 100° F. to 120° F., preferably at about 110° F. for about 14 to 18 hours, preferably 16 hours. A boiler and heating coils may be used within the container to maintain or control the temperature during this stage.

In a preferred embodiment of the invention, the Second Mixture may be thinned to a specific gravity of between 1.40 and 1.50, preferably about 1.45. The material may then be maintained in an insulated container for 20 to 28 hours, preferably about 24 hours, before being thinned to a specific gravity of approximately 1.40 to yield a base material ("the Base Material").

The Base Material is then transferred to a separate container and brought to a temperature of approximately 120° F. to 130° F., preferably about 125° F. A dilute mixture of the Base Material ("the Dilute Base Material") is then prepared by diluting the Base Material with water in a ratio of about 400:1 to 600:1, preferably 500:1. A commercially available blend containing humic acid and fulvic acid ("the Humic/Fulvic Blend") is added to the Dilute Base Material at a rate of approximately 2 pounds of Humic/Fulvic Blend per 100 gallons of Dilute Base Material to form a third mixture ("the Third Mixture"). The Third Mixture is allowed to circulate for about 0.5 to 3 hours, preferably about 1 hour. The Third Mixture is then cooled to below 120° F., preferably below about 100° F., and maintained in the container for a period of approximately 24 hours to form a finished product ("the Finished Product"). Preferably, one pound of the Humic/Fulvic Blend is used for about 55 gallons or 625 pounds of the Base Material.

The Humic/Fulvic Blend used in this application is commercially available, and is a modified potassium humate derived from leonardite. This material is alkali soluble, acid soluble, and fertilizer compatible. It is a black powder with a maximum moisture content of 10%, and a minimal solubility in water of 98%. The pH of a 10% solution of the Humic/Fulvic Blend has a minimum of about 8, and a maximum of 10, and is stable under dry conditions. It has a typical analysis of pH 9.0, 52.5% carbon, 17.6% soluble potash, 11.7% oxygen, 6.8% sulfur, 3% hydrogen, and is made by a process described in U.S. Pat. No. 5,663,425, which is hereby specifically incorporated herein by reference. This Humic/Fulvic Blend consists of approximately 70% organic acids ($BaCl_2$ method) 50% derived from Humic acids, 20% from Fulvic acids. The Humic/Fulvic Blend in solution will complex 10% zinc, 7% manganese, 5% copper, 5% iron, 5% calcium, and 4% magnesium nutrient solutions.

in diameter, aperture 2 203, approximately 3" in diameter, and aperture 3 204, approximately 3" in diameter. The side wall of the vessel 207, 209, 211 extends past a deck line 208 to aperture 4 210, approximately 3" in diameter. Aperture 5 212, approximately 4" in diameter, is located on a separate face of the lower portion of the vessel side wall. Aperture 6 213, approximately 1.5" in diameter is also located in the lower portion of the vessel side wall. A further element 214 is located in the base of the vessel 215, and is approximately 3" in diameter. Aperture 7 217 is 20" in diameter, and is located in the side of the vessel wall 216.

Figure 3:
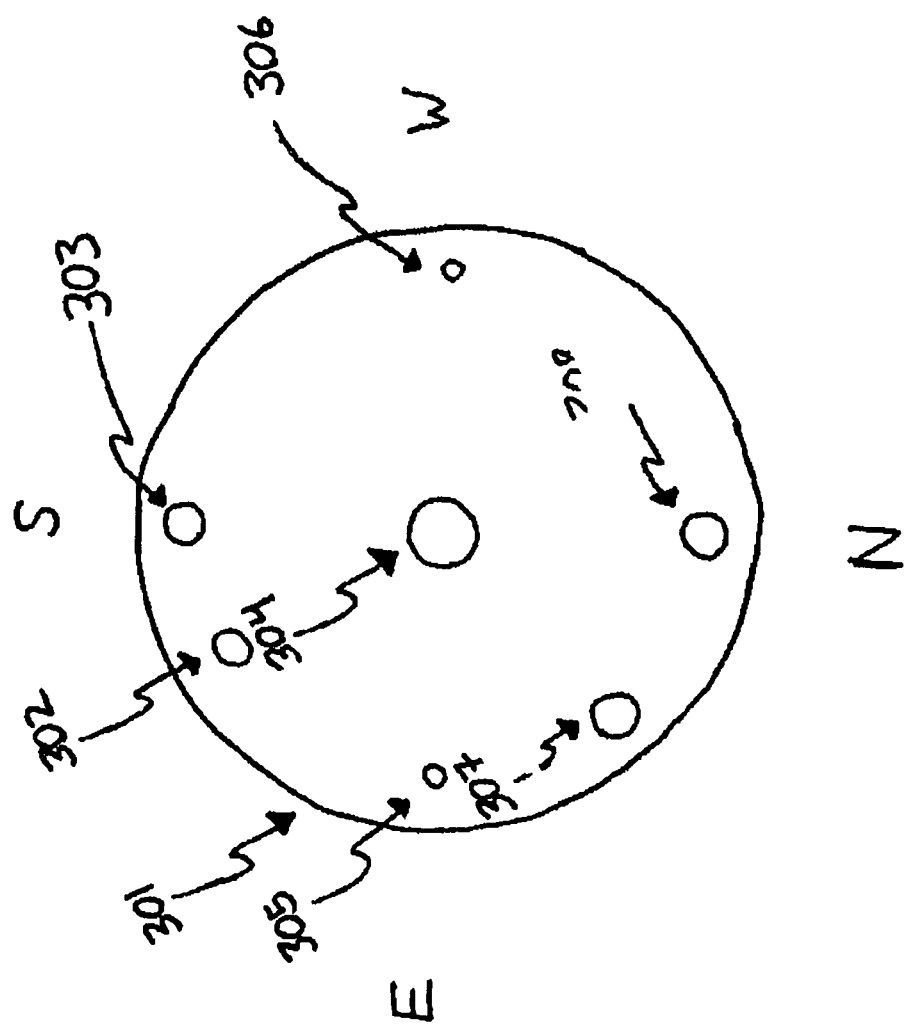
FIG. 3 shows a top view of a preferred embodiment of an apparatus used in the process of making a product which can be used to add supplemental materials to plants for the purpose of increasing or modifying growth or the composition of the plant.
Figure 4:
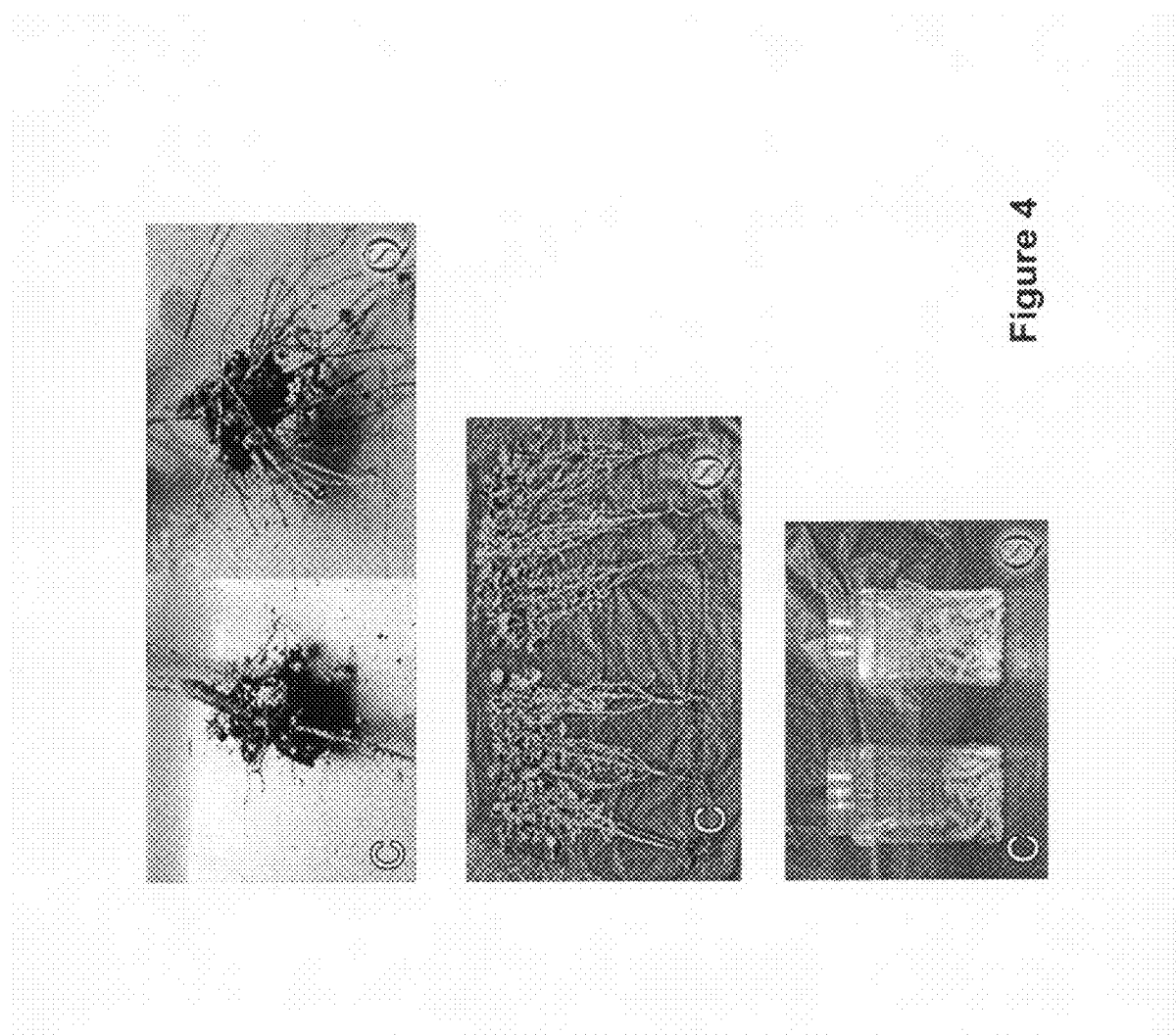
FIG. 4 shows a Soy Nodule Comparison (above), a Soy 1 Linear Meter Comparison (lower left), and a Soy Pod Comparison (lower right). Soy pods were harvested from the Soy 1 Linear Meter Comparison. The letter "C" denotes control plants not treated with aqueous metal hydride, and the letter "Q" denotes plants treated with aqueous metal hydride.
Figure 5:
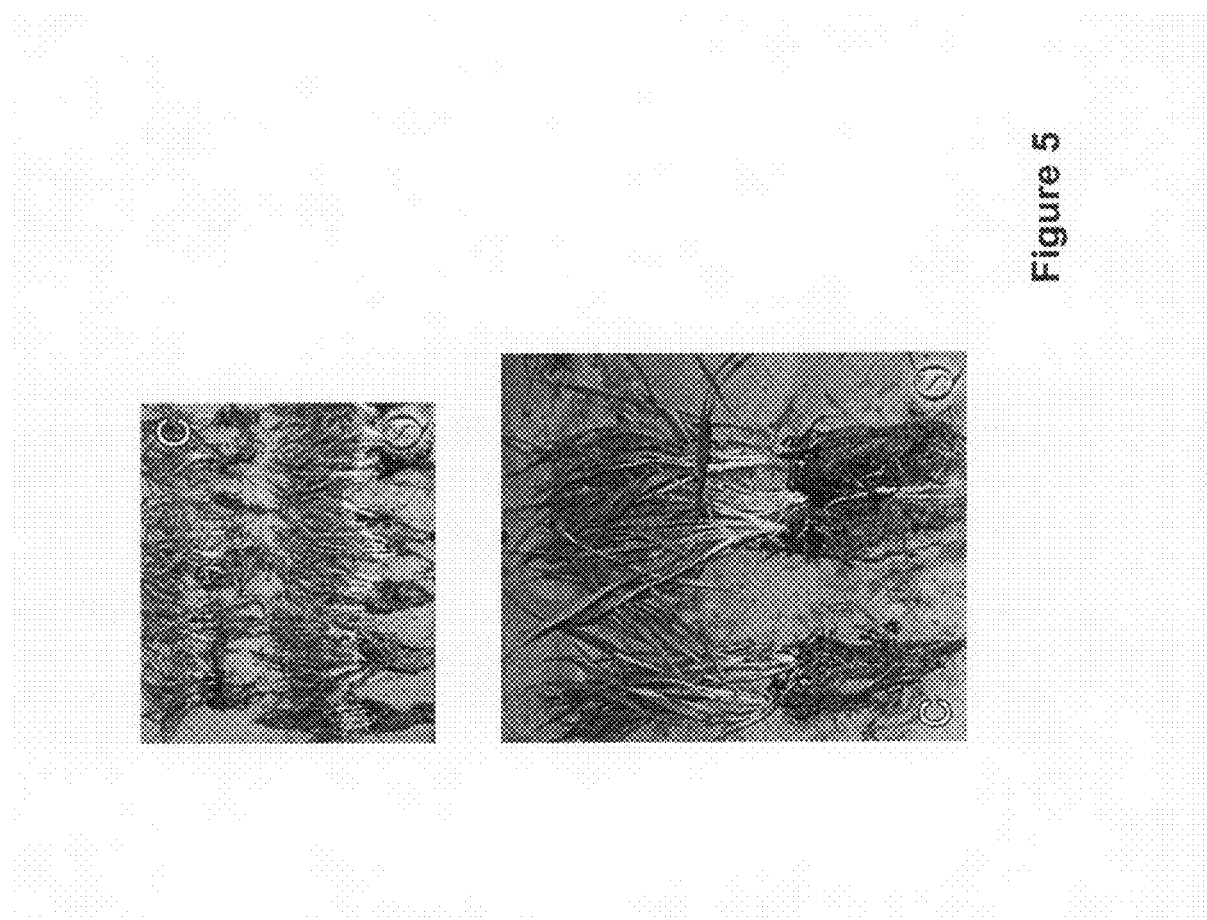
FIG. 5 shows a Wheat 1 Linear Meter Comparison (left), and a Wheat Comparison (right). The plants in the Wheat Comparison were taking from the plants shown in the Wheat 1 Linear Meter Comparison. The letter "C" denotes control plants not treated with aqueous metal hydride, and the letter "Q" denotes plants treated with aqueous metal hydride.
Figure 6:
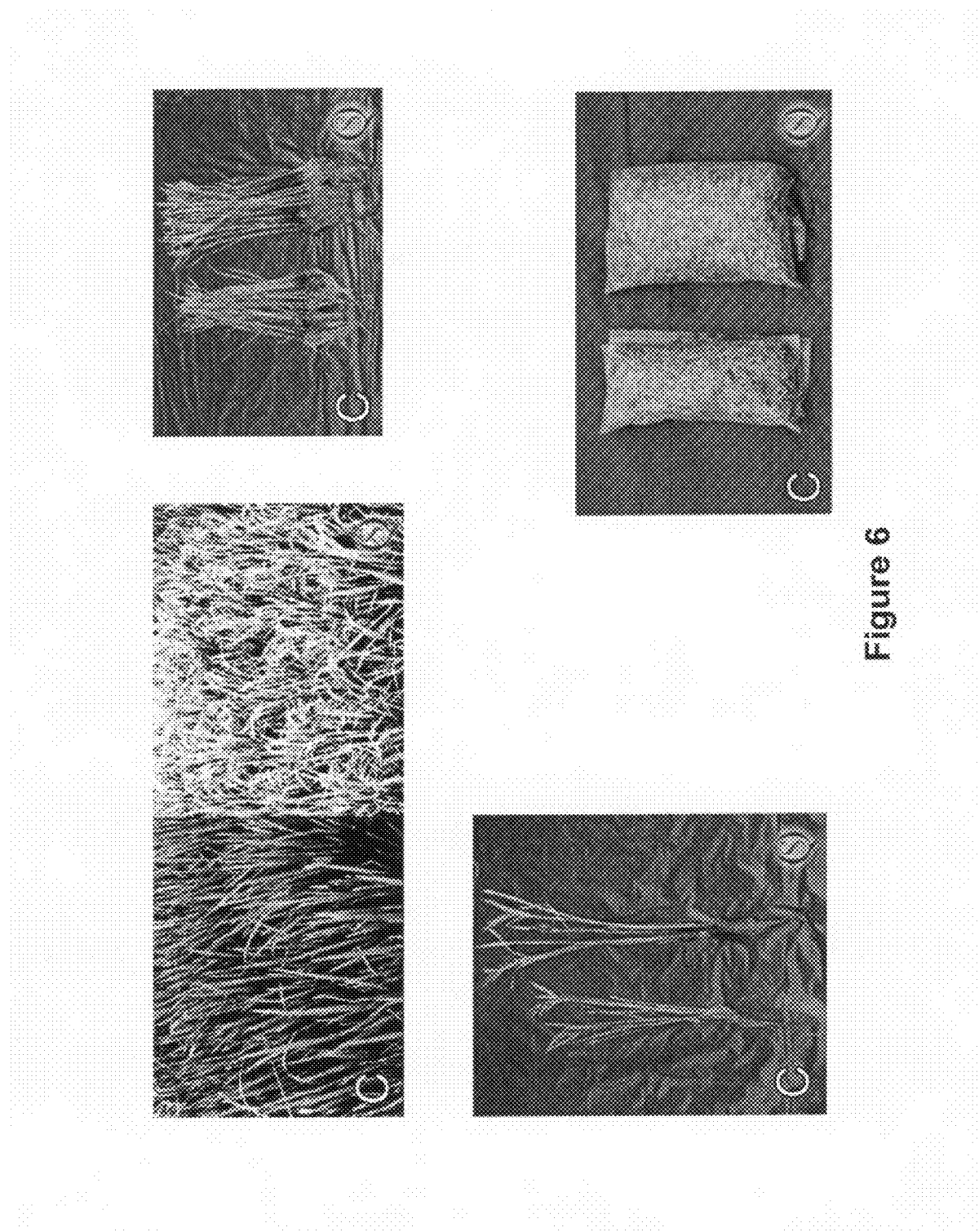
FIG. 6 shows a Rice Comparison (above), a Rice Spike Comparison (lower left), and a Rice Harvest 1 Linear Meter Comparison (lower right). The letter "C" denotes control plants not treated with aqueous metal hydride, and the letter "Q" denotes plants treated with aqueous metal hydride.
Figure 7:
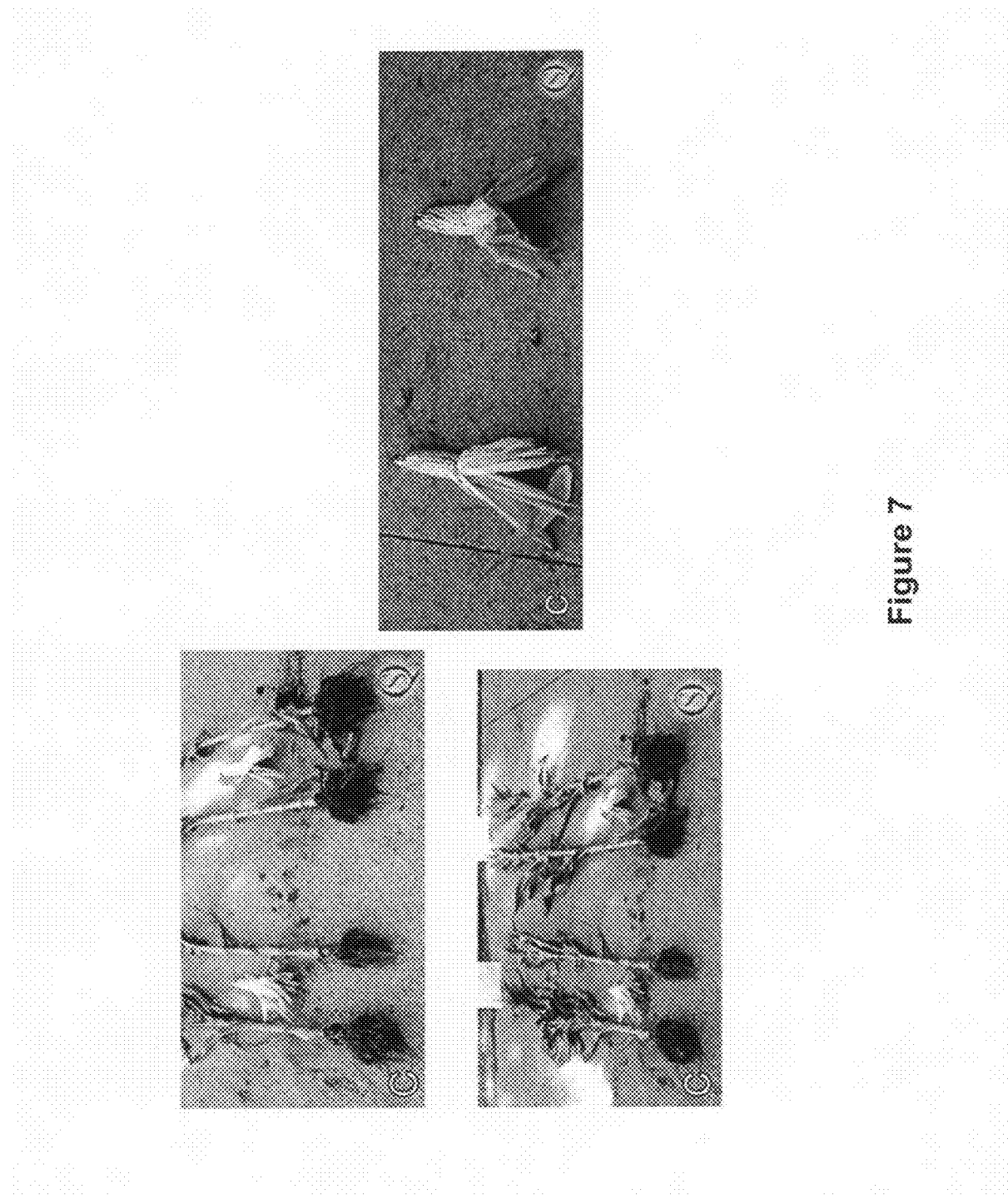
FIG. 7 shows a Corn Plant Comparison (above), and a Corn Cob Comparison (below). The letter "C" denotes control plants not treated with aqueous metal hydride, and the letter "Q" denotes plants treated with aqueous metal hydride.
Figure 8:
FIG. 8 shows a Sunflower Root Comparison. The letter "C" denotes control plants not treated with aqueous metal hydride, and the letter "Q" denotes plants treated with aqueous metal hydride.
Figure 9:
FIG. 9 shows a Cotton Comparison. The letter "C" denotes control plants not treated with aqueous metal hydride, and the letter "Q" denotes plants treated with aqueous metal hydride.
Figure 10:
FIG. 10 shows a Plantain Comparison. The letter "C" denotes control plants not treated with aqueous metal hydride, and the letter "Q" denotes plants treated with aqueous metal hydride.
Figure 11:
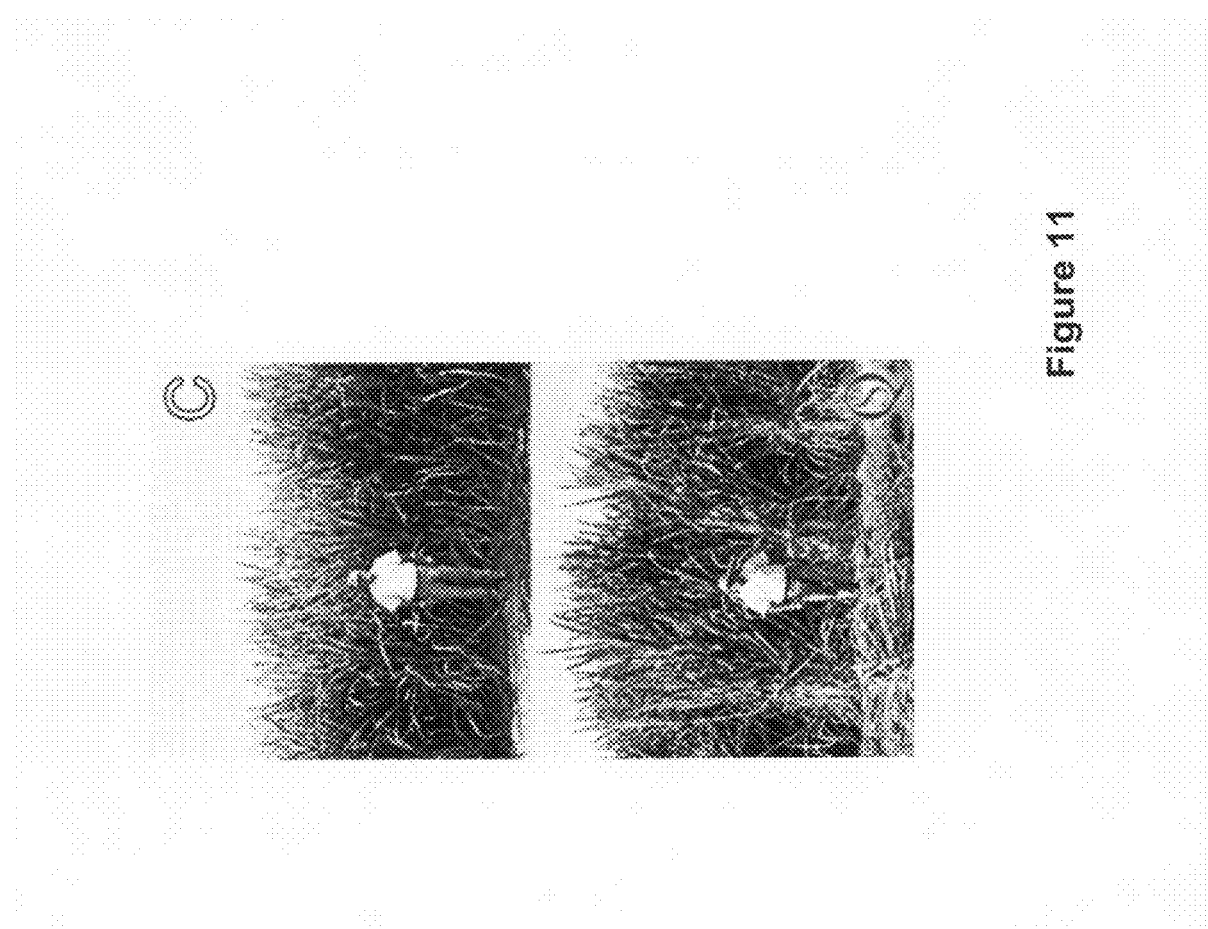
FIG. 11 shows a Sugar Cane Comparison. The letter "C" denotes control plants not treated with aqueous metal hydride, and the letter "Q" denotes plants treated with aqueous metal hydride.
Figure 12:
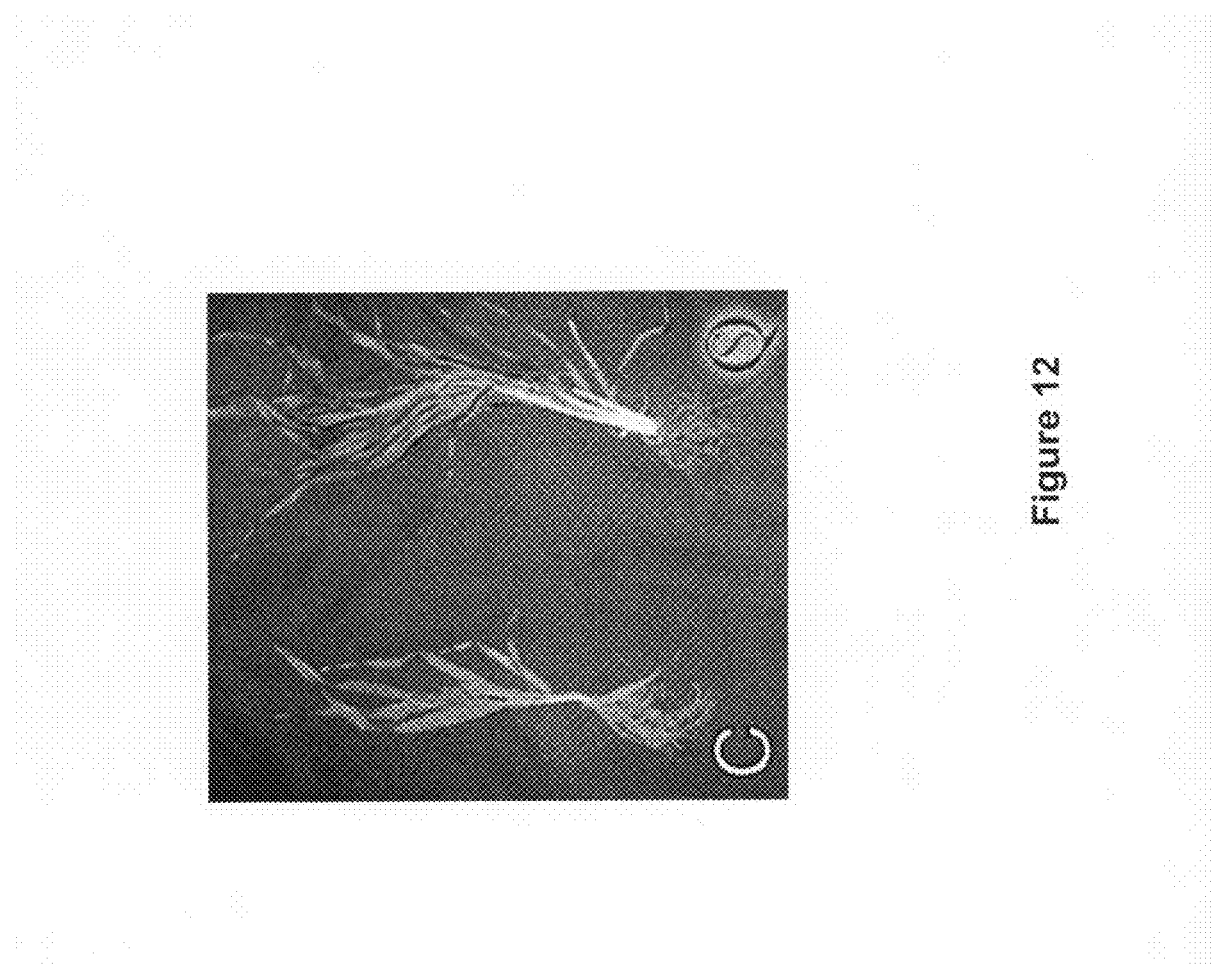
FIG. 12 shows a Barley Comparison. The letter "C" denotes control plants not treated with aqueous metal hydride, and the letter "Q" denotes plants treated with aqueous metal hydride.
Figure 13:
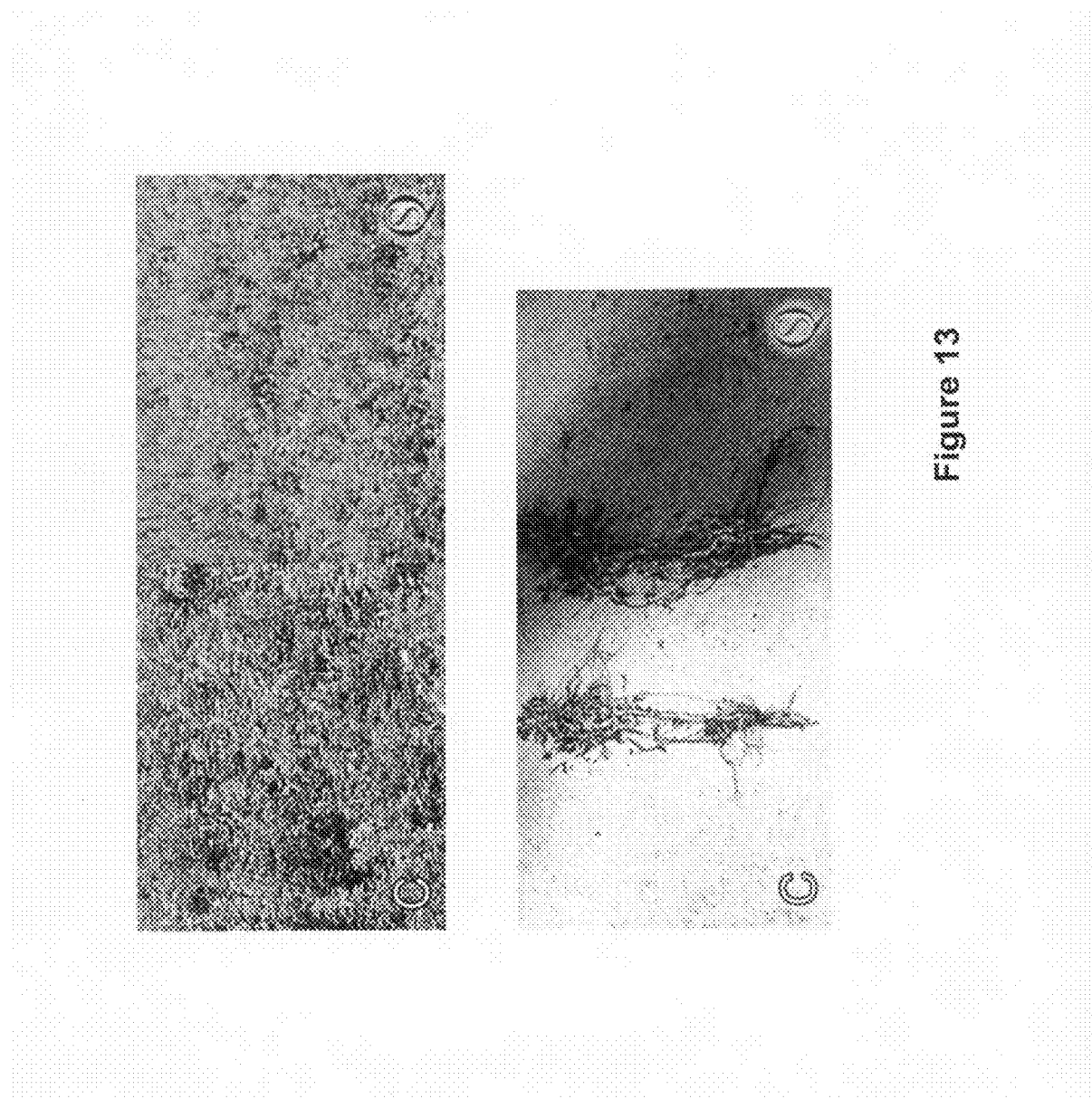
FIG. 13 shows an Alfalfa Comparison (above), and an Alfalfa Comparison (below). The letter "C" denotes control plants not treated with aqueous metal hydride, and the letter "Q" denotes plants treated with aqueous metal hydride.
Figure 14:
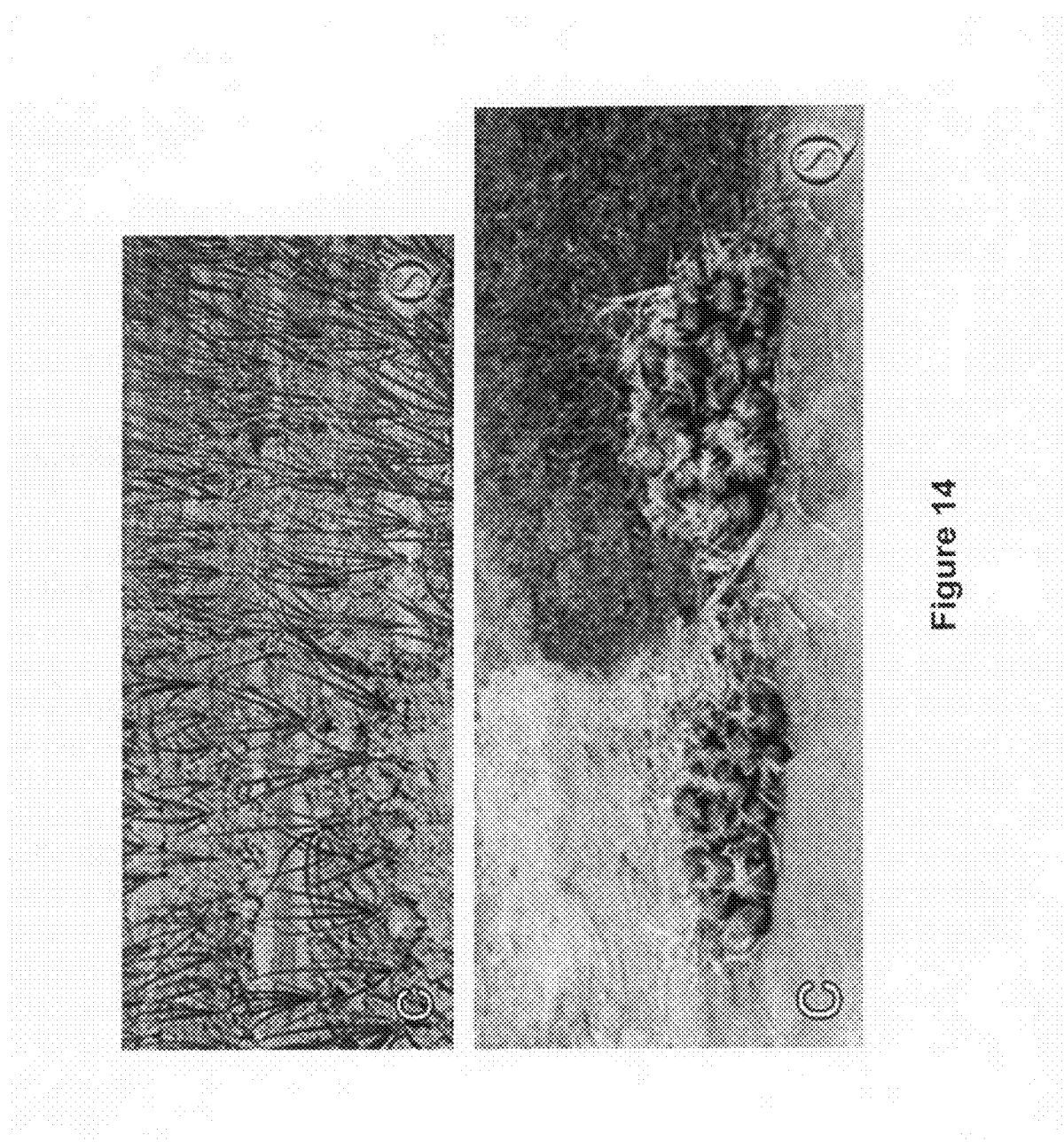
FIG. 14 shows an Onion Crop (above), and an Onion 1 Square Meter Comparison (below) The Onion 1 Square Meter Comparison was harvested from the Onion Crop shown above. The letter "C" denotes control plants not treated with aqueous metal hydride, and the letter "Q" denotes plants treated with aqueous metal hydride.
Figure 15:
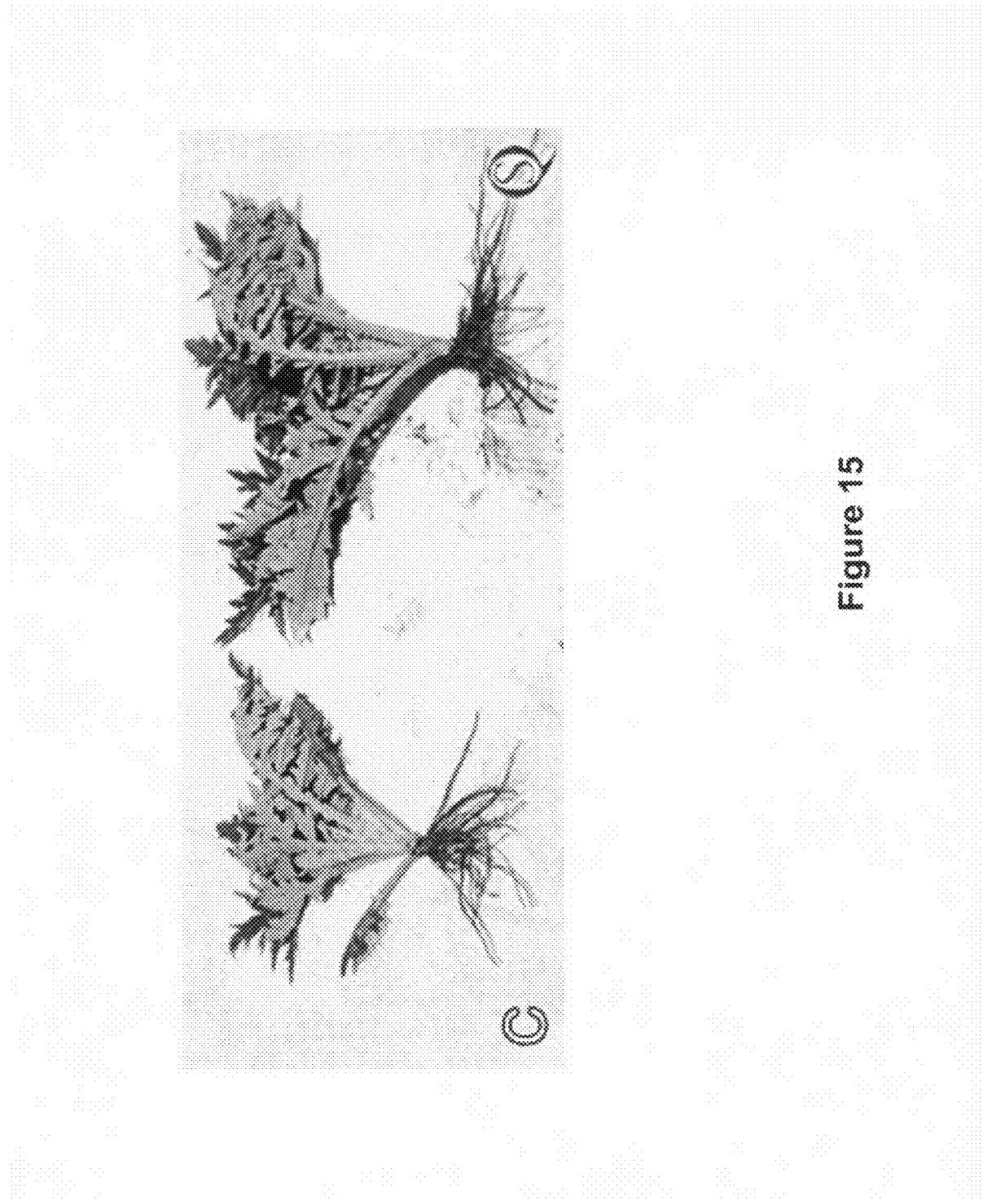
FIG. 15 shows an Artichoke Comparison. The letter "C" denotes control plants not treated with aqueous metal hydride, and the letter "Q" denotes plants treated with aqueous metal hydride.
Figure 16:
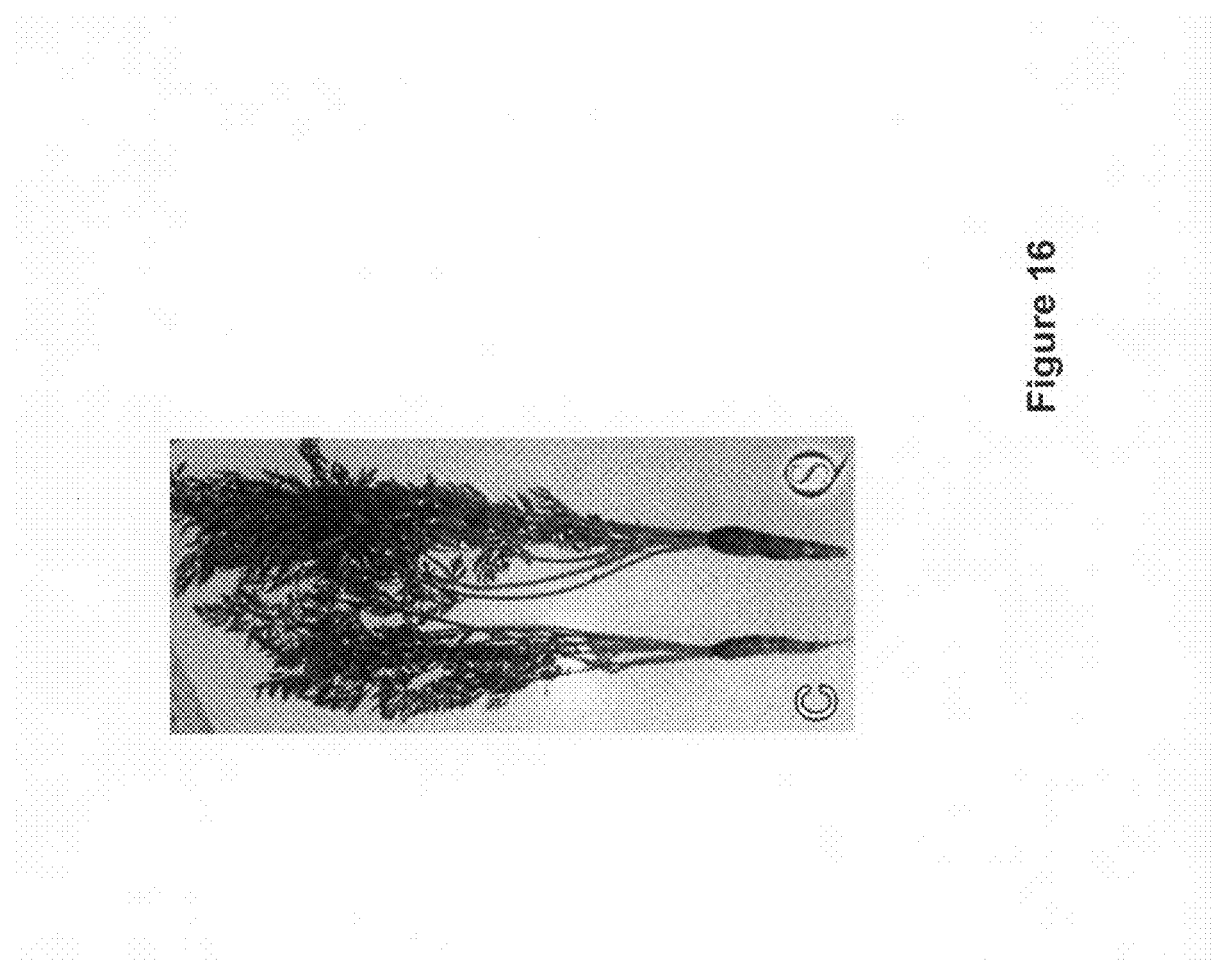
FIG. 16 shows a Carrot Comparison. The letter "C" denotes control plants not treated with aqueous metal hydride, and the letter "Q" denotes plants treated with aqueous metal hydride.
Figure 17:
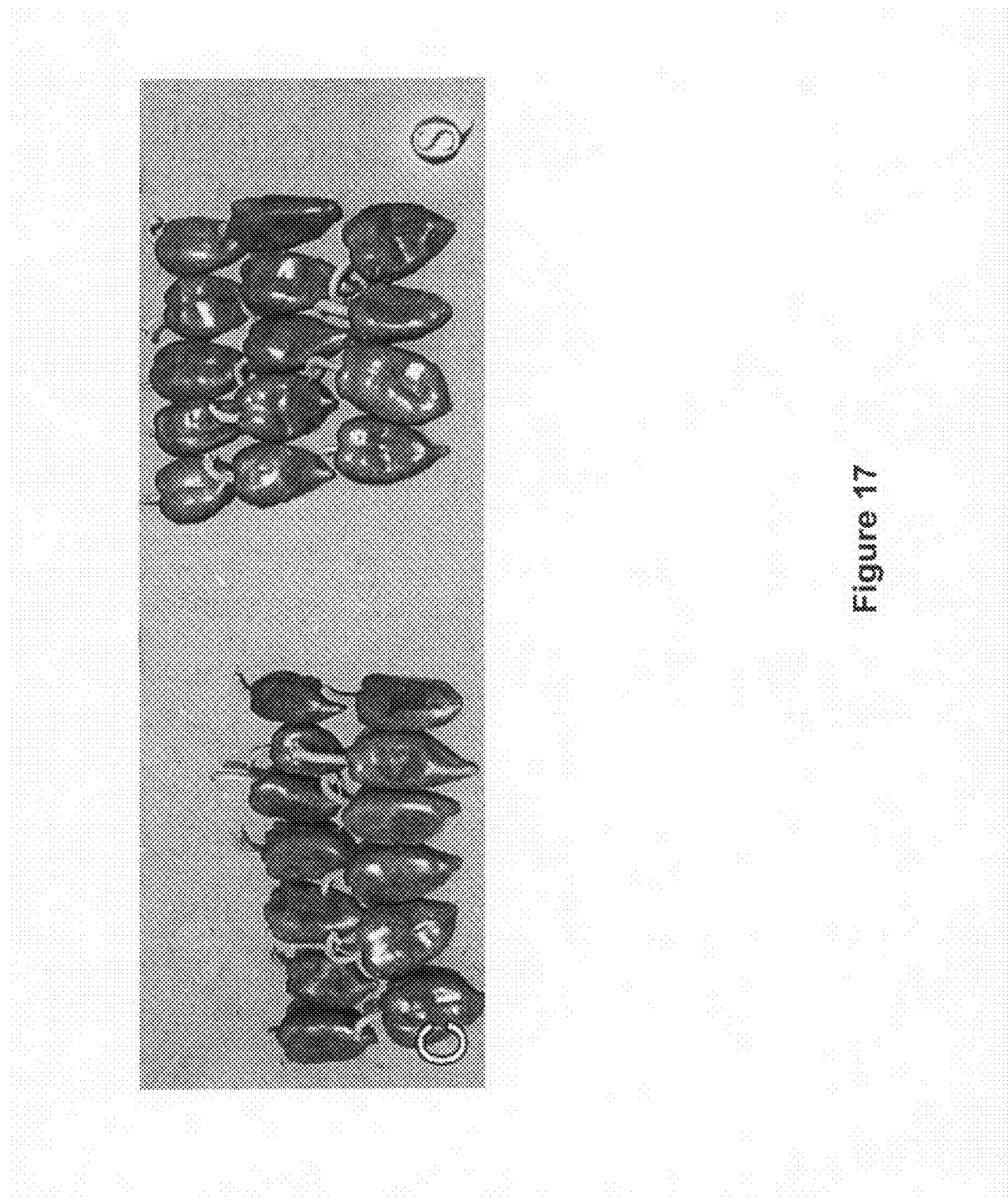
FIG. 17 shows a Pepper Yield Comparison. The letter "C" denotes control plants not treated with aqueous metal hydride, and the letter "Q" denotes plants treated with aqueous metal hydride.
Figure 18:
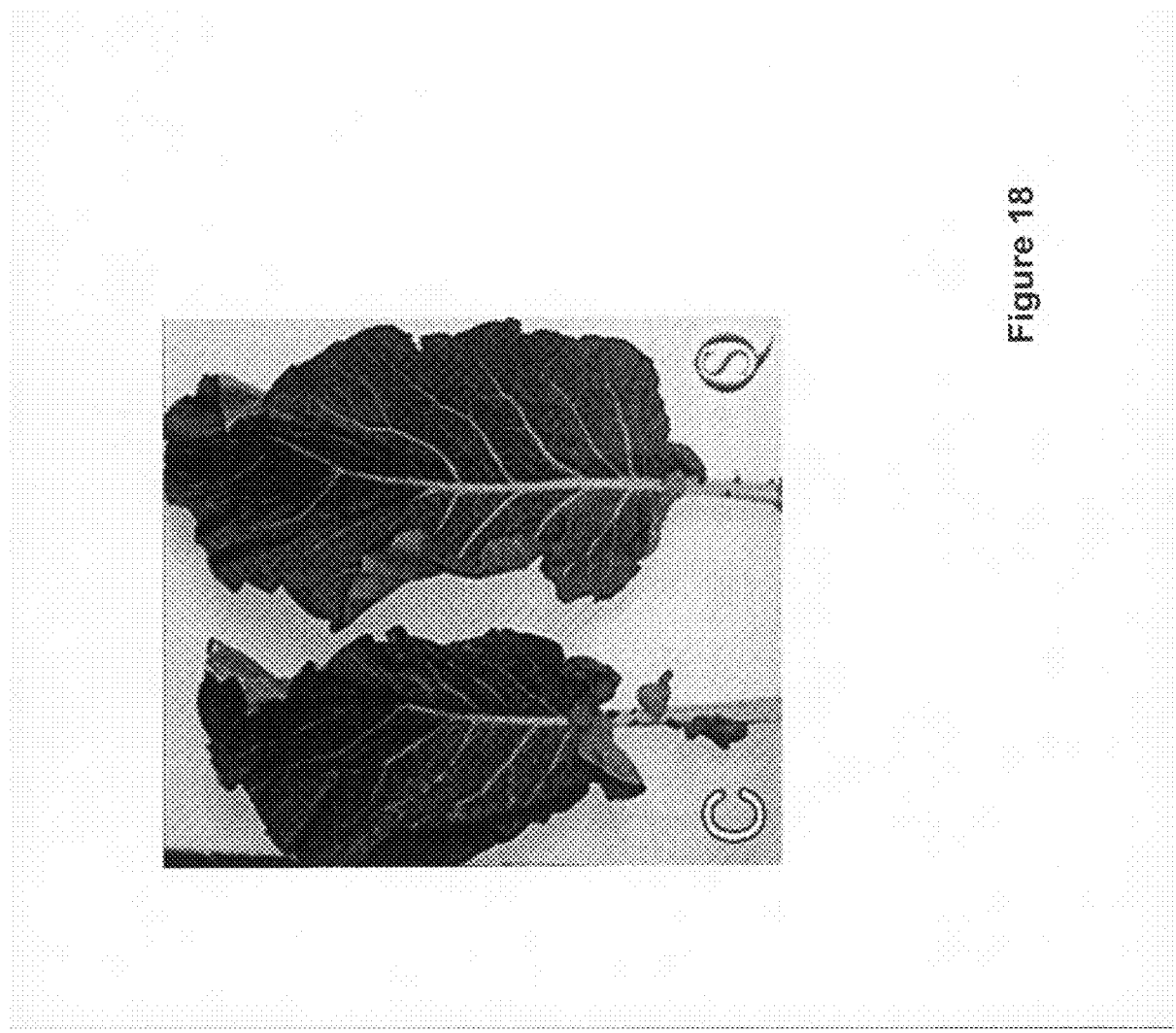
FIG. 18 shows a Cauliflower Leaf Comparison. The letter "C" denotes control plants not treated with aqueous metal hydride, and the letter "Q" denotes plants treated with aqueous metal hydride.
Figure 19:
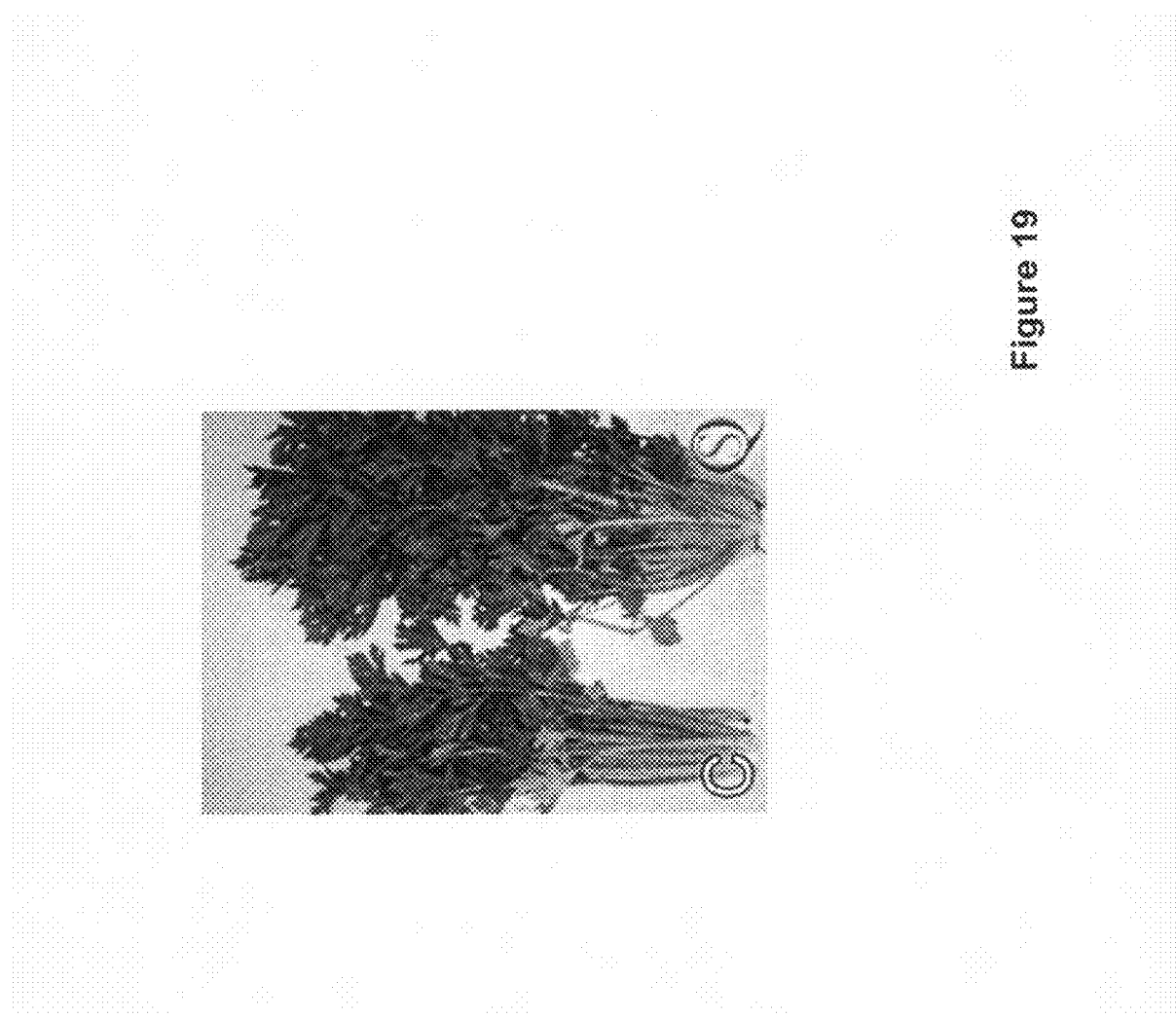
FIG. 19 shows a Celery Comparison. The letter "C" denotes control plants not treated with aqueous metal hydride, and the letter "Q" denotes plants treated with aqueous metal hydride.
Figure 20:
FIG. 20 shows a Cassava Comparison. The letter "C" denotes control plants not treated with aqueous metal hydride, and the letter "Q" denotes plants treated with aqueous metal hydride.
Figure 21:
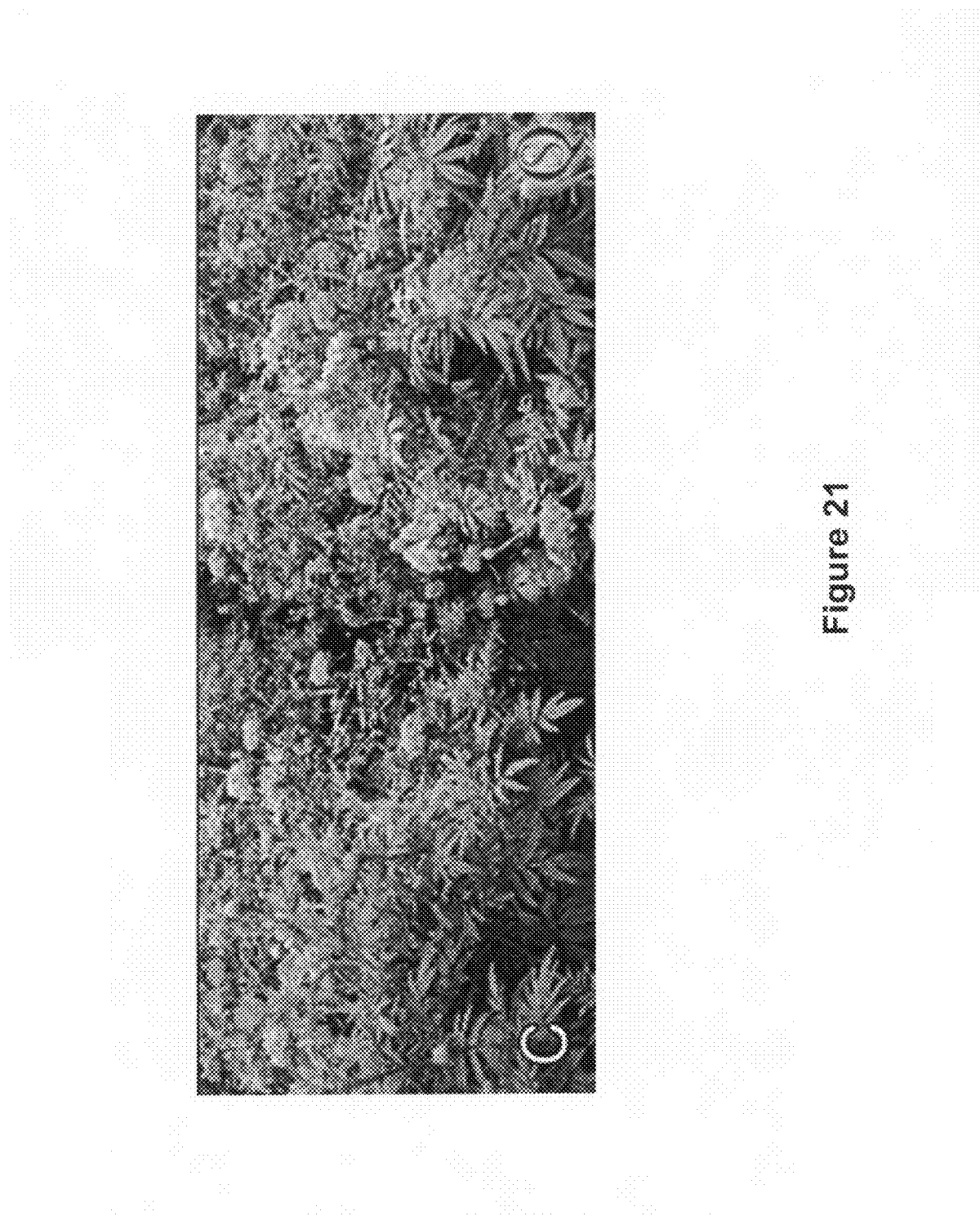
FIG. 21 shows a Marigold Comparison. The letter "C" denotes control plants not treated with aqueous metal hydride, and the letter "Q" denotes plants treated with aqueous metal hydride.
Figure 22:
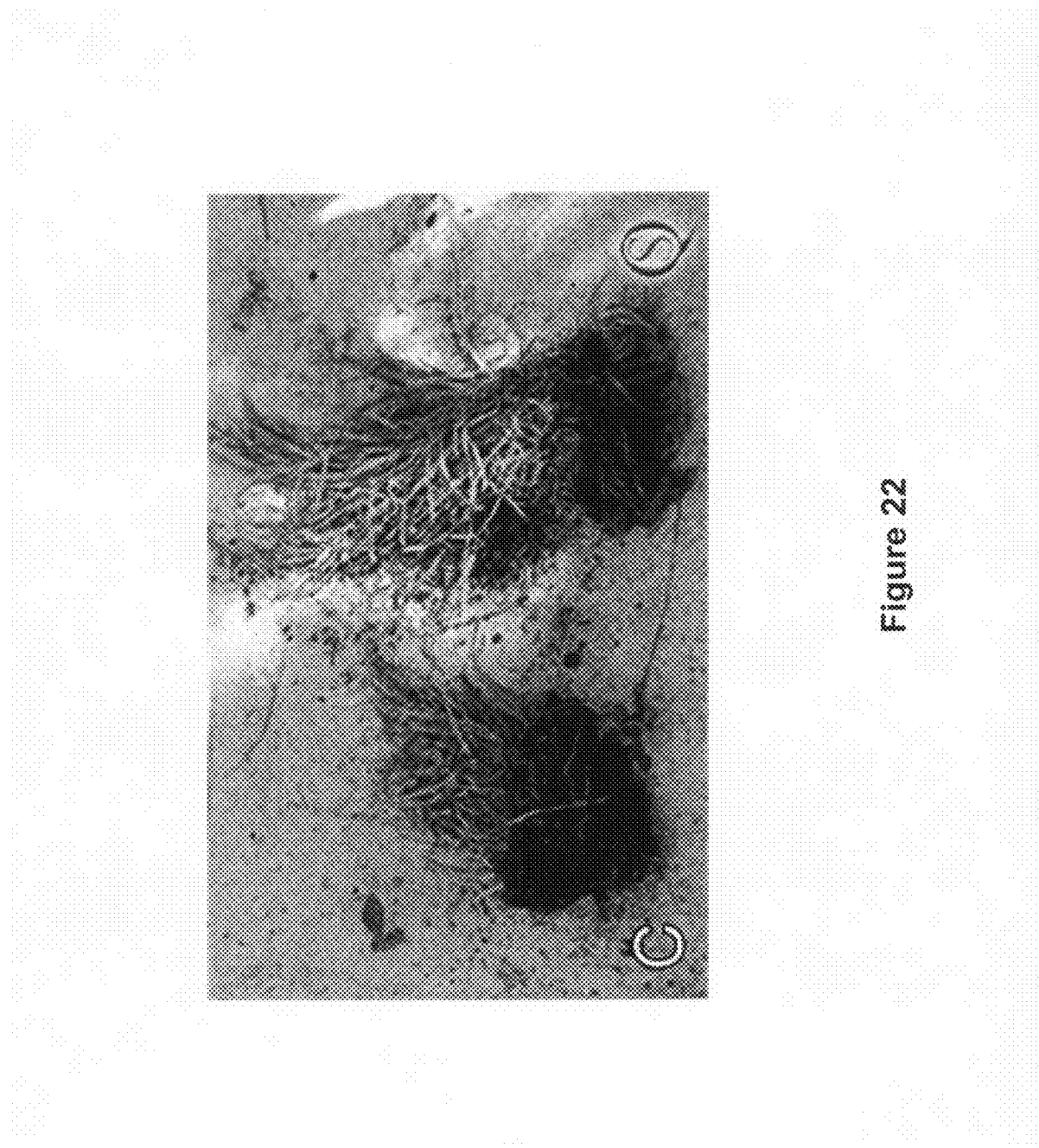
FIG. 22 shows a Pasture Comparison. The letter "C" denotes control plants not treated with aqueous metal hydride, and the letter "Q" denotes plants treated with aqueous metal hydride.
Figure 23:
FIG. 23 shows a Ginger Comparison. The letter "C" denotes control plants not treated with aqueous metal hydride, and the letter "Q" denotes plants treated with aqueous metal hydride.
Figure 24:
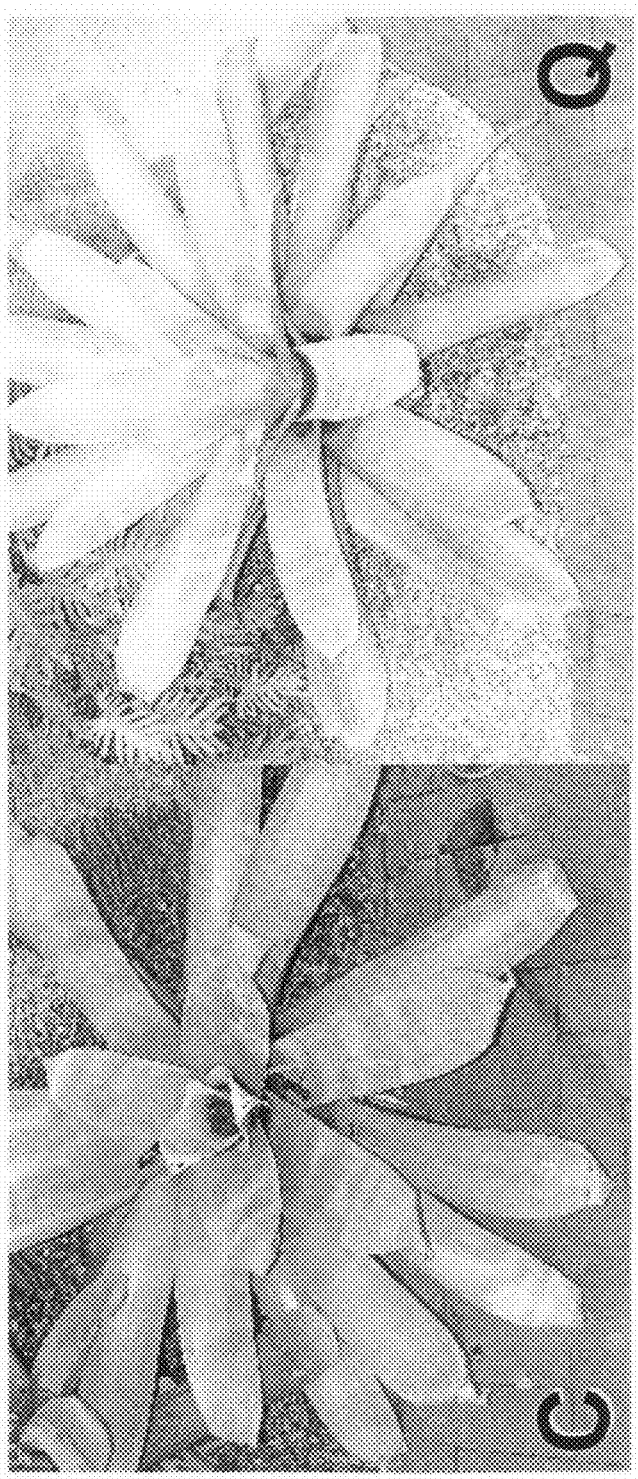
FIG. 24 shows a Bromeliad Comparison. The letter "C" denotes control plants not treated with aqueous metal hydride, and the letter "Q" denotes plants treated with aqueous metal hydride.
Figure 25:
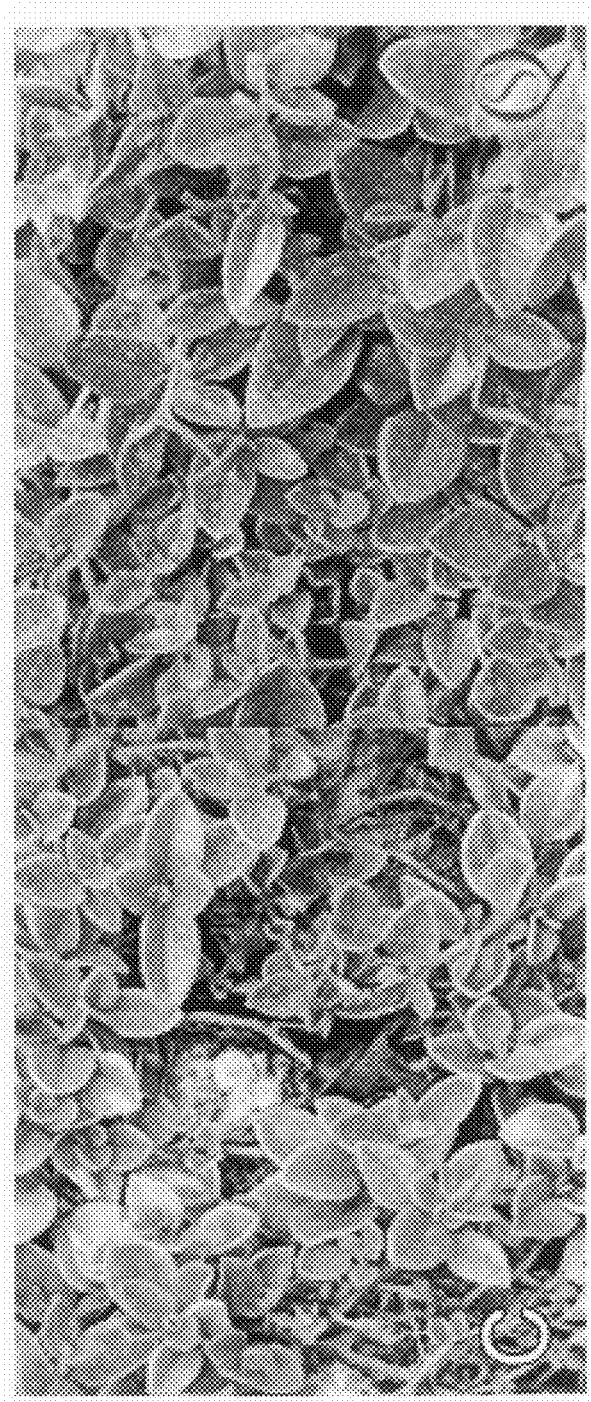
FIG. 25 shows an Ornamental after Freezing Temperatures Comparison. The letter "C" denotes control plants not treated with aqueous metal hydride, and the letter "Q" denotes plants treated with aqueous metal hydride.

The several apertures 302, 303, 305, 306, 307, 308, as well as the agitator 304 are visible in the top view of the vessel 301 depicted in FIG. 3.

Composition

A second aspect of this invention is the composition of the product. The composition comprises an aqueous metal hydride which can be used as a foliar spray or drench to add metals and organic acids to soil and to plants, preferably a combination of silicon, water, and sodium hydroxide, in a ration of about 14:6:1. The composition comprises silicon, sodium hydroxide, water, and the Humic/Fulvic Blend described in detail above, and may also comprise trace levels of additional minerals or elements. The composition is made using the process described herein.

Process for Improving Plant Growth, Production or Health

A third aspect of the invention includes a method for increasing plant growth, production or health by applying the product described herein as a foliar spray or drench, or through another means.

Example 1

The Finished Product described above was added to usual plant watering levels at a rate of about 7 to 10 fluid ounces per acre, per production cycle. Plants were watered according to normal procedure.

Example 2

To decrease water consumption by plants, the Finished Product described above was added to usual plant watering levels at a rate of about 7 to 10 fluid ounces per acre, per production cycle. Plants were watered according to normal procedure, reducing watering rate by 5% until a lower limit of water reduction was determined.

Example 3

To treat the presence of fungi or insects, the Finished Product described above was added to usual plant watering levels at a rate of about 10 to 15 fluid ounces per acre, per production cycle. Plants were watered according to normal procedure.

Example 4

To treat the presence of fungi or insects, the Finished Product described above was added to usual plant watering levels at a rate of about 10 to 15 fluid ounces per acre, per production cycle. Plants were watered according to normal procedure.

Example 5

To treat additional environmental, fungal or insect stress, the Finished Product described above was added to usual plant watering levels at a rate of about 7 to 10 fluid ounces per acre, per production cycle. Plants were watered according to normal procedure, and the treatment was repeated after 5 days.

Example 6

To treat additional environmental, fungal or insect stress, the Finished Product described above was added to usual plant watering levels at a rate of about 7 to 10 fluid ounces per acre, per production cycle. Plants were watered according to normal procedure, and the treatment was repeated every 5 days.

Example 8

One tablespoon of the Finished Product described above was added per one gallon of water. The combination was allowed to age 1 hour. The combination was then applied to plants every 10 to 15 days.

Example 7

To treat the presence of fungi or insects, two tablespoons of the Finished Product described above were added per one gallon of water. The combination was allowed to age 1 hour. The combination was then applied to plants every 10 to 15 days.

REFERENCES CITED

The following references, to the extent that they provide exemplary procedural or other details supplementary to those set forth herein, are specifically incorporated herein by reference.

U.S. Patent Documents

U.S. Pat. No. 5,663,425 to Detroit et al.
U.S. Pat. No. 4,571,328 to Rice.
U.S. Pat. No. 4,570,713 to Rice.

Publications

U.S. Patent Publication 2006/0027251 with Elledge listed as the Inventor.
Matichenkov, V V and Bocharnikova E. A. *New Technologies for Optimizing Irrigation and Increasing Soil Fertility in Dry and Semi-Dry Regions*. Technical Session on Agriculture Conservation at the International Water Demand Management Conference May 30 to Jun. 3, 2004.

What is claimed is:

1. A composition for improving plant growth prepared from a mixture consisting essentially of silicon, sodium hydroxide, water, and a humic acid and fulvic acid blend, wherein the weight ratio of silicon to water to sodium hydroxide in the mixture is approximately 14 to 6 to 1.

2. The composition of claim 1, wherein the mixture further includes trace levels of additional minerals or elements.

\* \* \* \* \*